United States Patent
Lin

(10) Patent No.: US 11,531,589 B1
(45) Date of Patent: Dec. 20, 2022

(54) DECODING METHOD, MEMORY STORAGE DEVICE, AND MEMORY CONTROL CIRCUIT UNIT

(71) Applicant: PHISON ELECTRONICS CORP., Miaoli (TW)

(72) Inventor: Yu-Hsiang Lin, Yunlin County (TW)

(73) Assignee: PHISON ELECTRONICS CORP., Miaoli (TW)

(*) Notice: Subject to any disclaimer, the term of this patent is extended or adjusted under 35 U.S.C. 154(b) by 0 days.

(21) Appl. No.: 17/495,815

(22) Filed: Oct. 7, 2021

(30) Foreign Application Priority Data

Sep. 8, 2021 (TW) ................... 110133451

(51) Int. Cl.
*G06F 11/00* (2006.01)
*G06F 11/10* (2006.01)
*G06F 3/06* (2006.01)

(52) U.S. Cl.
CPC ........ *G06F 11/1068* (2013.01); *G06F 3/0619* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 2005/0146451 A1* | 7/2005 | Kobayashi | ........... | H04N 19/196 375/E7.184 |
| 2012/0117439 A1* | 5/2012 | Lee | ................ | H03M 13/1111 714/752 |
| 2013/0311840 A1* | 11/2013 | Miyata | ................ | H04L 1/203 714/704 |
| 2016/0142076 A1* | 5/2016 | Poznanski | ............ | H03M 13/41 714/776 |
| 2017/0041826 A1* | 2/2017 | Hersent | ................ | H04W 12/02 |
| 2017/0206130 A1* | 7/2017 | Hsiao | ................ | G06F 11/1068 |

OTHER PUBLICATIONS

X. Zhang, D. Xiong, K. Zhao, C. W. Chen and T. Zhang, "Realizing Low-Cost Flash Memory Based Video Caching in Content Delivery Systems," in IEEE Transactions on Circuits and Systems for Video Technology, vol. 28, No. 4, pp. 984-996, Apr. 2018, doi: 10.1109/TCSVT.2016.2637820. (Year: 2018).*

* cited by examiner

Primary Examiner — Daniel F. McMahon
(74) Attorney, Agent, or Firm — JCIPRNET

(57) ABSTRACT

A decoding method, a memory storage device, and a memory control circuit unit are provided. The decoding method includes: respectively performing a single-frame decoding on a plurality of first data frames read from a physical unit set, the physical unit set contains a plurality of first physical units in a rewritable non-volatile memory module; in response to an entire decoding result of the first data frames meeting a first condition, obtaining error evaluation information related to the physical unit set, and the error evaluation information reflects a bit error status of the physical unit set; obtaining reliability information according to the error evaluation information; and performing the single-frame decoding on a second data frame read from one of the first physical units according to the reliability information.

26 Claims, 11 Drawing Sheets

DECODING METHOD, MEMORY STORAGE DEVICE, AND MEMORY CONTROL CIRCUIT UNIT

CROSS-REFERENCE TO RELATED APPLICATION

This application claims the priority benefit of Taiwan application serial no. 110133451, filed on Sep. 8, 2021. The entirety of the above-mentioned patent application is hereby incorporated by reference herein and made a part of this specification.

BACKGROUND

Technical Field

The disclosure relates to memory management technology, and particularly relates to a decoding method, a memory storage device, and a memory control circuit unit.

Description of Related Art

Portable electronic devices such as mobile phones and notebook computers have grown rapidly in the past few years, which has led to a rapid increase in consumer demand for storage media. As the rewritable non-volatile memory module (for example, a flash memory) has characteristics such as non-volatile data, power saving, small size, and no mechanical structure, the rewritable non-volatile memory module is very suitable for being built into the various portable electronic devices exemplified above.

Generally speaking, in order to ensure the correctness of data in the rewritable non-volatile memory module, the data is first encoded and then stored to the rewritable non-volatile memory module. When reading the data, the data read from the rewritable non-volatile memory module is decoded to try to correct errors therein. If the errors in the data are all corrected, the corrected data is sent back to a host system. In some encoding/decoding technologies, data stored to multiple physical pages may be encoded into the same block code. The data belonging to the same block code may protect each other. For example, when a certain data in a block code cannot be corrected via its own error correcting code, data stored to other physical pages in the block code may be used to assist the data in error correction. However, traditionally, the encoding/decoding of the block codes and the single-page encoding/decoding of the physical pages are independent of one another.

SUMMARY

The disclosure provides a decoding method, a memory storage device, and a memory control circuit unit, which can improve decoding capability of data frames in a specific physical unit set according to error evaluation information of the physical unit set.

An exemplary embodiment of the disclosure provides a decoding method, which is used in a memory storage device. The memory storage device includes a rewritable non-volatile memory module. The rewritable non-volatile memory module includes multiple physical units. The decoding method includes the following steps. A single-frame decoding is respectively performed on multiple first data frames read from a physical unit set. The physical unit set contains multiple first physical units among the physical units. In response to an entire decoding result of the first data frames meeting a first condition, error evaluation information related to the physical unit set is obtained. The error evaluation information reflects a bit error status of the physical unit set. Reliability information is obtained according to the error evaluation information. The single-frame decoding is performed on a second data frame read from one of the first physical units according to the reliability information.

An exemplary embodiment of the disclosure also provides a memory storage device, which includes a connection interface unit, a rewritable non-volatile memory module, and a memory control circuit unit. The connection interface unit is used to couple to a host system. The rewritable non-volatile memory module includes multiple physical units. The memory control circuit unit is coupled to the connection interface unit and the rewritable non-volatile memory module. The memory control circuit unit is used to respectively perform a single-frame decoding on multiple first data frames read from a physical unit set. The physical unit set contains multiple first physical units among the physical units. In response to an entire decoding result of the first data frames meeting a first condition, the memory control circuit unit is further used to obtain error evaluation information related to the physical unit set. The error evaluation information reflects a bit error status of the physical unit set. The memory control circuit unit is further used to obtain reliability information according to the error evaluation information. The memory control circuit unit is further used to perform the single-frame decoding on a second data frame read from one of the first physical units according to the reliability information.

An exemplary embodiment of the disclosure also provides a memory control circuit unit, which is used to control a rewritable non-volatile memory module. The rewritable non-volatile memory module includes multiple physical units. The memory control circuit unit includes a host interface, a memory interface, an error detecting and correcting circuit, and a memory management circuit. The host interface is used to couple to a host system. The memory interface is used to couple to the rewritable non-volatile memory module. The memory management circuit is coupled to the host interface, the memory interface, and the error detecting and correcting circuit. The error detecting and correcting circuit is used to respectively perform a single-frame decoding on multiple first data frames read from a physical unit set. The physical unit set contains multiple first physical units among the physical units. In response to an entire decoding result of the first data frames meeting a first condition, the memory management circuit is further used to obtain error evaluation information related to the physical unit set. The error evaluation information reflects a bit error status of the physical unit set. The memory management circuit is further used to obtain reliability information according to the error evaluation information. The error detecting and correcting circuit is further used to perform the single-frame decoding on a second data frame read from one of the first physical units according to the reliability information.

An exemplary embodiment of the disclosure also provides a memory storage device, which includes a connection interface unit, a rewritable non-volatile memory module, and a memory control circuit unit. The connection interface unit is used to couple to a host system. The rewritable non-volatile memory module includes multiple physical units. The memory control circuit unit is coupled to the connection interface unit and the rewritable non-volatile memory module. The memory control circuit unit is used to respectively perform a single-frame decoding on multiple first data frames read from a physical unit set. The physical unit set contains multiple first physical units among the physical units. In response to an entire decoding result of the first data frames meeting a first condition, the memory control circuit unit updates reliability information and perform the single-frame decoding on a second data frame read from one of the first physical units according to the updated reliability information. In response to the entire decoding result of the first data frames not meeting the first condition, the memory control circuit unit is further used to perform a multi-frame decoding on the first data frames.

Based on the above, after performing the multi-frame encoding on the first data frames stored to the specific physical unit set, the error evaluation information related to the physical unit set may be obtained. In particular, the error evaluation information may reflect the entire bit error status of the physical unit set. Thereafter, the reliability information may be obtained according to the error evaluation information, and the single-frame decoding may be performed on the second data frame read from one of the first physical units according to the reliability information. In this way, the decoding capability of the data frames in the physical unit set can be improved.

DETAILED DESCRIPTION OF DISCLOSED EMBODIMENTS

Generally speaking, a memory storage device (also referred to as a memory storage system) includes a rewritable non-volatile memory module and a controller (also referred to as a control circuit). The memory storage device may be used together with a host system, so that the host system may write data to the memory storage device or read data from the memory storage device.

Figure 1:
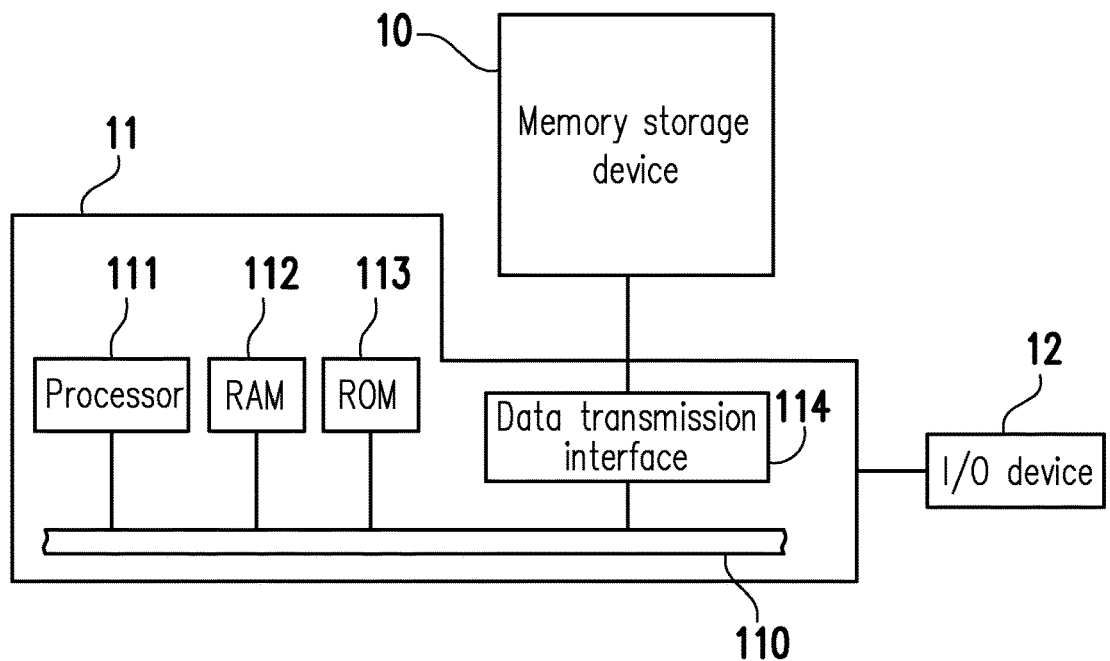
FIG. 1 is a schematic diagram of a host system, a memory storage device, and an input/output (I/O) device according to an exemplary embodiment of the disclosure.
Figure 2:
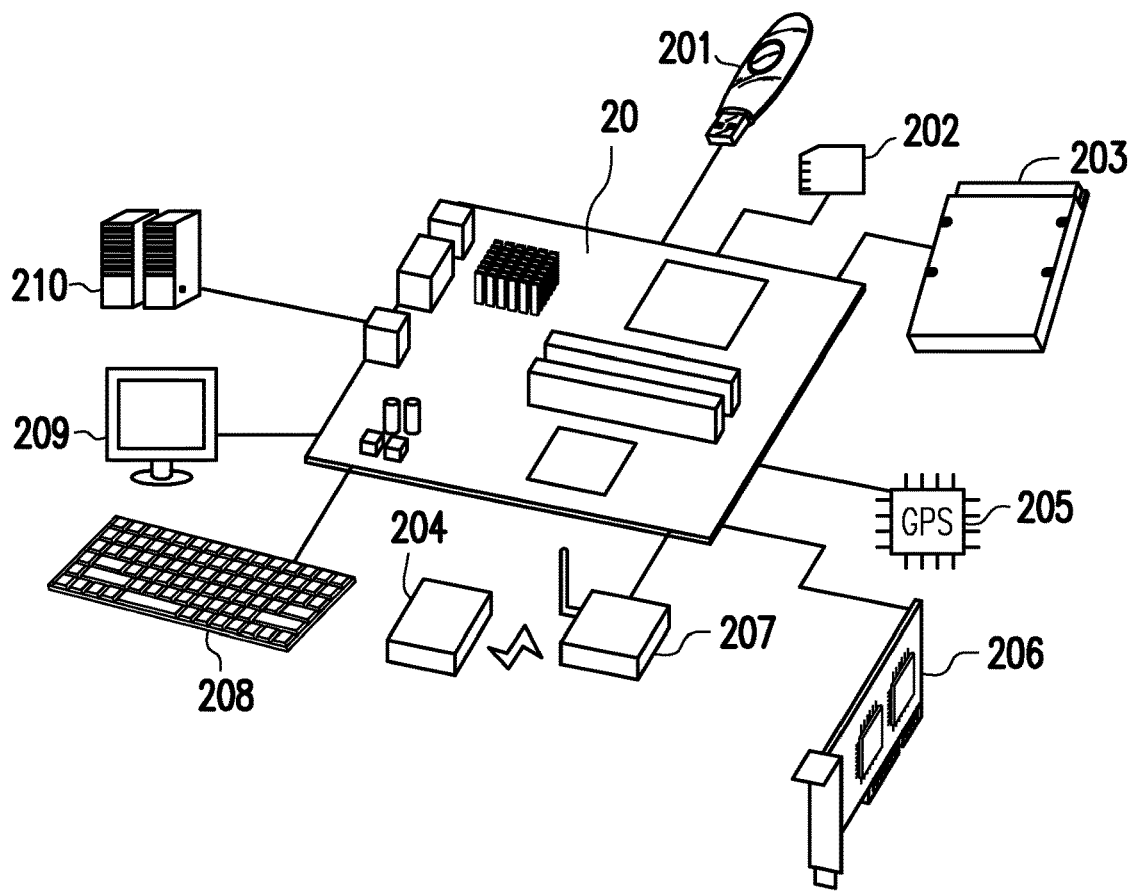
FIG. 2 is a schematic diagram of a host system, a memory storage device, and an I/O device according to an exemplary embodiment of the disclosure.

FIG. 1 is a schematic diagram of a host system, a memory storage device, and an input/output (I/O) device according to an exemplary embodiment of the disclosure. FIG. 2 is a schematic diagram of a host system, a memory storage device, and an I/O device according to an exemplary embodiment of the disclosure.

Please refer to FIG. 1 and FIG. 2. A host system 11 may include a processor 111, a random access memory (RAM) 112, a read only memory (ROM) 113, and a data transmission interface 114. The processor 111, the random access memory 112, the read only memory 113, and the data transmission interface 114 may be coupled to a system bus 110.

In an exemplary embodiment, the host system 11 may be coupled to the memory storage device 10 through the data transmission interface 114. For example, the host system 11 may store data to the memory storage device 10 or read data from the memory storage device 10 via the data transmission interface 114. In addition, the host system 11 may be coupled to the I/O device 12 through the system bus 110. For example, the host system 11 may send an output signal to the I/O device 12 or receive an input signal from the I/O device 12 via the system bus 110.

In an exemplary embodiment, the processor 111, the random access memory 112, the read only memory 113, and the data transmission interface 114 may be disposed on a motherboard 20 of the host system 11. The number of the data transmission interface 114 may be one or more. Through the data transmission interface 114, the motherboard 20 may be coupled to the memory storage device 10 via a wired or wireless manner.

In an exemplary embodiment, the memory storage device 10 may be, for example, a flash drive 201, a memory card 202, a solid state drive (SSD) 203, or a wireless memory storage device 204. The wireless memory storage device 204 may be, for example, a near field communication (NFC) memory storage device, a Wi-Fi memory storage device, a Bluetooth memory storage device, a low-power Bluetooth memory storage device (for example, iBeacon), or other memory storage devices based on various wireless communication technologies. In addition, the motherboard 20 may also be coupled to a global positioning system (GPS) module 205, a network interface card 206, a wireless transmission device 207, a keyboard 208, a screen 209, a speaker 210, or various other I/O devices through the system bus 110. For example, in an exemplary embodiment, the motherboard 20 may access the wireless memory storage device 204 through the wireless transmission device 207.

In an exemplary embodiment, the host system 11 is a computer system. In an exemplary embodiment, the host system 11 may be any system that may substantially cooperate with a memory storage device to store data. In an exemplary embodiment, the memory storage device 10 and the host system 11 may respectively include a memory storage device 30 and a host system 31 of FIG. 3.

Figure 3:
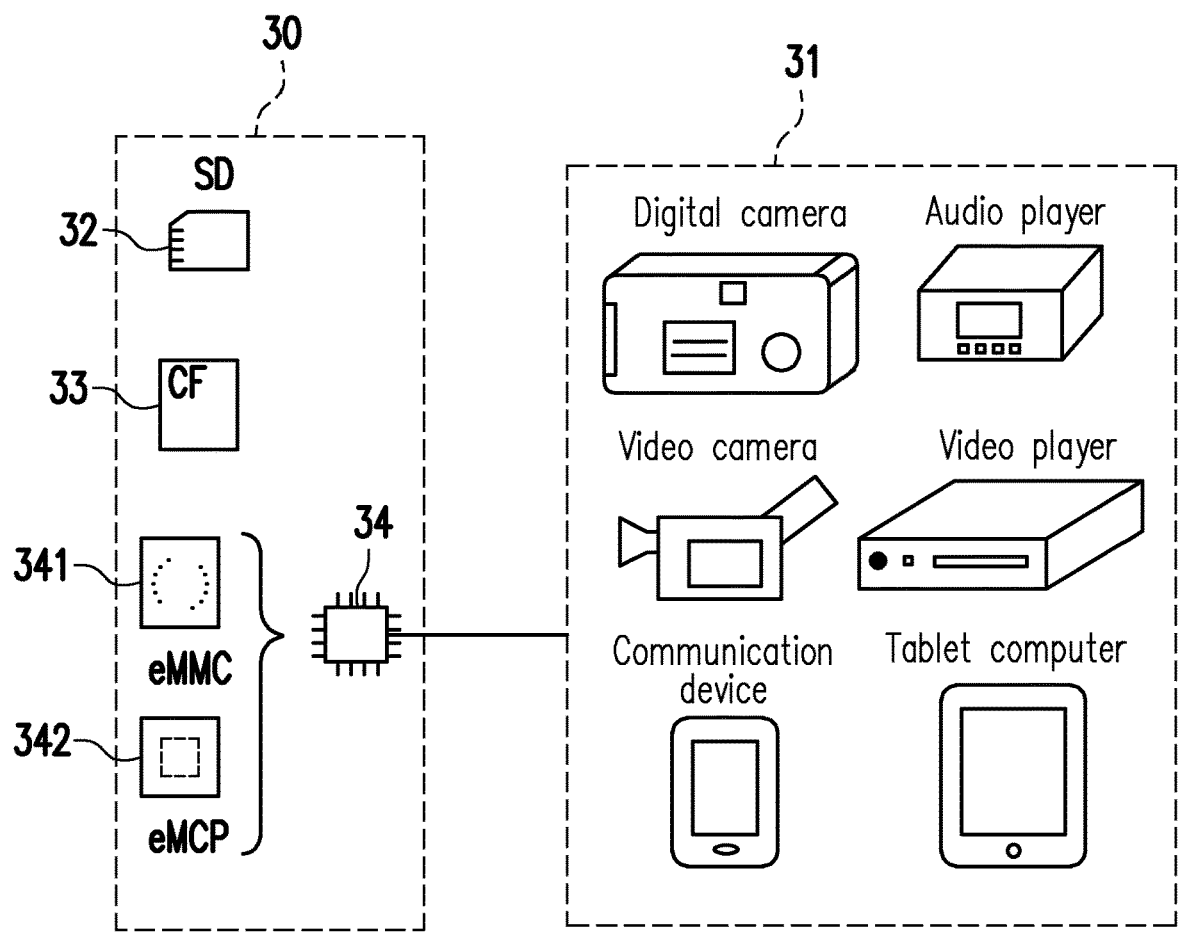
FIG. 3 is a schematic diagram of a host system and a memory storage device according to an exemplary embodiment of the disclosure.

FIG. 3 is a schematic diagram of a host system and a memory storage device according to an exemplary embodiment of the disclosure. Please refer to FIG. 3. The memory storage device 30 may be used in conjunction with the host system 31 to store data. For example, the host system 31 may be a digital camera, a video camera, a communication device, an audio player, a video player, a tablet computer, or other systems. For example, the memory storage device 30 may be a secure digital (SD) card 32, a compact flash (CF) card 33, an embedded storage device 34, or various other non-volatile memory storage devices used by the host system 31. The embedded storage device 34 includes an embedded multi media card (eMMC) 341, an embedded multi chip package (eMCP) storage device 342, and/or various other embedded storage devices in which a memory module is directly coupled onto a substrate of a host system.

Figure 4:
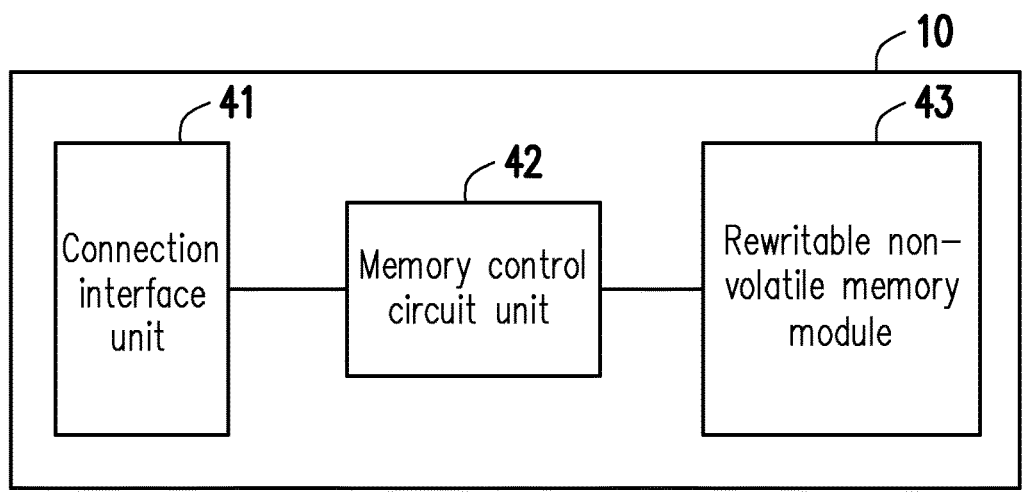
FIG. 4 is a schematic diagram of a memory storage device according to an exemplary embodiment of the disclosure.

FIG. 4 is a schematic diagram of a memory storage device according to an exemplary embodiment of the disclosure. Please refer to FIG. 4. The memory storage device 10 includes a connection interface unit 41, a memory control circuit unit 42, and a rewritable non-volatile memory module 43.

The connection interface unit 41 is used to couple the memory storage device 10 to the host system 11. The memory storage device 10 may communicate with the host system 11 via the connection interface unit 41. In an exemplary embodiment, the connection interface unit 41 is compatible with the peripheral component interconnect express (PCI express) standard. In an exemplary embodiment, the connection interface unit 41 may also conform to the serial advanced technology attachment (SATA) standard, the parallel advanced technology attachment (PATA) standard, the Institute of Electrical and Electronic Engineers (IEEE) 1394 standard, the universal serial bus (USB) standard, the SD interface standard, the ultra high speed-I (UHS-I) interface standard, the ultra high speed-II (UHS-II) interface standard, the memory stick (MS) interface standard, the multi chip package (MCP) interface standard, the multi media card (MMC) interface standard, the eMMC interface standard, the universal flash storage (UFS) interface standard, the eMCP interface standard, the CF interface standard, the integrated device electronics (IDE) standard, or other suitable standards. The connection interface unit 41 and the memory control circuit unit 42 may be packaged in a chip, or the connection interface unit 41 may be arranged outside a chip containing the memory control circuit unit 42.

The memory control circuit unit 42 is coupled to the connection interface unit 41 and the rewritable non-volatile memory module 43. The memory control circuit unit 42 is used to perform multiple logic gates or control commands implemented in the form of hardware or the form of firmware and perform operations such as data writing, reading, and erasing in the rewritable non-volatile memory module 43 according to a command of the host system 11.

The rewritable non-volatile memory module 43 is used to store data written by the host system 11. The rewritable non-volatile memory module 43 may include a single level cell (SLC) NAND flash memory module (that is, a flash memory module that may store 1 bit in a memory cell), a multi level cell (MLC) NAND flash memory module (that is, a flash memory module that may store 2 bits in a memory cell), a triple level cell (TLC) NAND flash memory module (that is, a flash memory module that may store 3 bits in a memory cell), a quad level cell (QLC) NAND flash memory module (that is, a flash memory module that may store 4 bits in a memory cell), other flash memory modules, or other memory modules with the same characteristics.

Each memory cell in the rewritable non-volatile memory module 43 stores one or more bits with changes in voltage (hereinafter also referred to as a threshold voltage). Specifically, there is a charge trapping layer between a control gate and a channel of each memory cell. Through applying a write voltage to the control gate, the number of electrons in the charge trapping layer may be changed, thereby changing the threshold voltage of the memory cell. The operation of changing the threshold voltage of the memory cell is also referred to as "writing data to the memory cell" or "programming the memory cell". As the threshold voltage changes, each memory cell in the rewritable non-volatile memory module 43 has multiple storage statuses. Through applying a read voltage, it is possible to judge which storage status a memory cell belongs to, thereby obtaining one or more bits stored to the memory cell.

In an exemplary embodiment, the memory cells of the rewritable non-volatile memory module 43 may constitute multiple physical programming units, and the physical programming units may constitute multiple physical erasing units. Specifically, the memory cells on the same word line may form one or more physical programming units. If each memory cell may store more than 2 bits, the physical programming units on the same word line may be at least classified into a lower physical programming unit and an upper physical programming unit. For example, a least significant bit (LSB) of a memory cell belongs to the lower physical programming unit, and a most significant bit (MSB) of a memory cell belongs to the upper physical programming unit. Generally speaking, in the MLC NAND flash memory, the write speed of the lower physical programming unit is greater than the write speed of the upper physical programming unit and/or the reliability of the lower physical programming unit is higher than the reliability of the upper physical programming unit.

In an exemplary embodiment, the physical programming unit is the smallest unit of programming. That is, the physical programming unit is the smallest unit of writing data. For example, the physical programming unit may be a physical page or a physical sector. If the physical programming unit is a physical page, the physical programming units may include a data bit area and a redundancy bit area. The data bit area contains multiple physical sectors for storing user data, and the redundancy bit area is used to store system data (for example, management data such as an error correcting code). In an exemplary embodiment, the data bit area contains 32 physical sectors, and the size of one physical sector is 512 bytes (B). However, in other exemplary embodiments, the data bit area may also contain 8, 16, more, or less physical sectors, and the size of each physical sector may also be greater or smaller. On the other hand, the physical erasing unit is the smallest unit of erasure. That is, each physical erasing unit contains the smallest number of memory cells to be erased together. For example, the physical erasing unit is a physical block.

Figure 5:
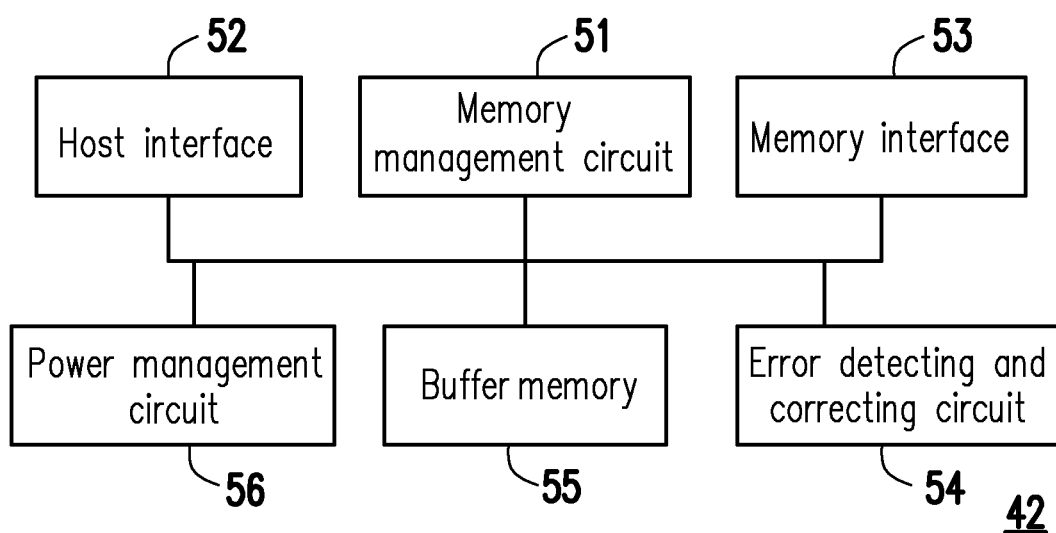
FIG. 5 is a schematic diagram of a memory control circuit unit according to an exemplary embodiment of the disclosure.

FIG. 5 is a schematic diagram of a memory control circuit unit according to an exemplary embodiment of the disclosure. Please refer to FIG. 5. The memory control circuit unit 42 includes a memory management circuit 51, a host interface 52, a memory interface 53, and an error detecting and correcting circuit 54.

The memory management circuit 51 is used to control the entire operation of the memory control circuit unit 42. Specifically, the memory management circuit 51 has multiple control commands, and when the memory storage device 10 is operating, the control commands are performed to perform operations such as data writing, reading, and erasing. The following description of the operation of the memory management circuit 51 is equivalent to the description of the operation of the memory control circuit unit 42.

In an exemplary embodiment, the control commands of the memory management circuit 51 are implemented in the form of firmware. For example, the memory management circuit 51 has a microprocessor unit (not shown) and a read only memory (not shown), and the control commands are burnt into the read only memory. When the memory storage device 10 is operating, the control commands are performed by the microprocessor unit to perform operations such as data writing, reading, and erasing.

In another exemplary embodiment, the control commands of the memory management circuit 51 may also be stored to a specific area (for example, a system area dedicated to storing system data in a memory module) of the rewritable non-volatile memory module 43 in the form of program codes. In addition, the memory management circuit 51 has a microprocessor unit (not shown), a read only memory (not shown), and a random access memory (not shown). In particular, the read only memory has a boot code, and when the memory control circuit unit 42 is enabled, the microprocessor unit first performs the boot code to load the control commands stored to the rewritable non-volatile memory module 43 into the random access memory of the memory management circuit 51. After that, the microprocessor unit runs the control commands to perform operations such as data writing, reading, and erasing.

In an exemplary embodiment, the control commands of the memory management circuit 51 may also be implemented in the form of hardware. For example, the memory management circuit 51 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is used to manage a memory cell or a memory cell group of the rewritable non-volatile memory module 43. The memory write circuit is used to issue a write command sequence to the rewritable non-volatile memory module 43 to write data to the rewritable non-volatile memory module 43. The memory read circuit is used to issue a read command sequence to the rewritable non-volatile memory module 43 to read data from the rewritable non-volatile memory module 43. The memory erase circuit is used to issue an erase command sequence to the rewritable non-volatile memory module 43 to erase data from the rewritable non-volatile memory module 43. The data processing circuit is used to process data to be written to the rewritable non-volatile memory module 43 and data read from the rewritable non-volatile memory module 43. The write command sequence, the read command sequence, and the erase command sequence may each include one or more program codes or command codes and are used to instruct the rewritable non-volatile memory module 43 to perform corresponding operations such as writing, reading, and erasing. In an exemplary embodiment, the memory management circuit 51 may also issue other types of command sequences to the rewritable non-volatile memory module 43 to instruct to perform corresponding operations.

The host interface 52 is coupled to the memory management circuit 51. The memory management circuit 51 may communicate with the host system 11 through the host interface 52. The host interface 52 may be used to receive and identify commands and data sent by the host system 11. For example, the commands and the data sent by the host system 11 may be sent to the memory management circuit 51 through the host interface 52. In addition, the memory management circuit 51 may send the data to the host system 11 through the host interface 52. In the exemplary embodiment, the host interface 52 is compatible with the PCI express standard. However, it must be understood that the disclosure is not limited thereto. The host interface 52 may also be compatible with the SATA standard, the PATA standard, the IEEE 1394 standard, the USB standard, the SD standard, the UHS-I standard, the UHS-II standard, the MS standard, the MMC standard, the eMMC standard, the UFS standard, the CF standard, the IDE standard, or other suitable data transmission standards.

The memory interface 53 is coupled to the memory management circuit 51 and is used to access the rewritable non-volatile memory module 43. For example, the memory management circuit 51 may access the rewritable non-volatile memory module 43 through the memory interface 53. In other words, data to be written to the rewritable non-volatile memory module 43 is converted into a format acceptable by the rewritable non-volatile memory module 43 via the memory interface 53. Specifically, if the memory management circuit 51 intends to access the rewritable non-volatile memory module 43, the memory interface 53 will send the corresponding command sequence. For example, the command sequences may include the write command sequence instructing to write data, the read command sequence instructing to read data, the erase command sequence instructing to erase data, and corresponding command sequences instructing various memory operations (for example, changing a read voltage level, performing a garbage collection operation, etc.). The command sequences are, for example, generated by the memory management circuit 51 and sent to the rewritable non-volatile memory module 43 through the memory interface 53. The command sequences may include one or more signals, or data on a bus. The signals or the data may include command codes or program codes. For example, the read command sequence includes information such as a read recognition code and a memory address.

The error detecting and correcting circuit 54 is coupled to the memory management circuit 51 and is used to perform error detecting and correcting operations to ensure correctness of data. Specifically, when the memory management circuit 51 receives a write command from the host system 11, the error detecting and correcting circuit 54 generates a corresponding error correcting code (ECC) and/or error detecting code (EDC) for data corresponding to the write command, and the memory management circuit 51 writes the data corresponding to the write command and the corresponding error correcting code and/or error detecting code to the rewritable non-volatile memory module 43. Later, when the memory management circuit 51 reads the data from the rewritable non-volatile memory module 43, the error correcting code and/or the error detecting code corresponding to the data will also be read, and the error detecting and correcting circuit 54 will perform error detecting and correcting operations on the read data according to the error correcting code and/or the error detecting code. For example, the error detecting and correcting circuit 54 may support various encoding/decoding algorithms such as low density parity check (LDPC) codes, BCH codes, Reed-Solomon (RS) codes, and exclusive OR (XOR) codes.

The basic unit for the error detecting and correcting circuit 54 to perform encoding/decoding is a frame (also referred to as a data frame). One frame may include multiple data bits. In an exemplary embodiment, one frame includes 256 bits. However, in another exemplary embodiment, one frame may also include more (for example, 4K bytes) or less bits.

The error detecting and correcting circuit 54 may perform single-frame encoding and decoding on data in a single frame, and the error detecting and correcting circuit 54 may also perform multi-frame encoding and decoding on data in multiple frames. In an exemplary embodiment, the error detecting and correcting circuit 54 performs the single-frame encoding and decoding based on the LDPC codes, and the disclosure is not limited thereto. In an exemplary embodiment, the error detecting and correcting circuit 54 performs the multi-frame encoding and decoding based on the BCH codes, the RS codes, and/or the XOR codes, and the disclosure is not limited thereto. According to the adopted encoding/decoding algorithm, the error detecting and correcting circuit 54 may encode data to be protected to generate the corresponding error correcting code and/or error detecting code. Thereafter, the error correcting code and/or the error detecting code generated via the encoding may be used to correct errors in the data to be protected. For the convenience of description, the error correcting code and/or the error detecting code generated via the encoding are collectively referred to as parity data below.

In an exemplary embodiment, the memory control circuit unit 42 further includes a buffer memory 55 and a power management circuit 56. The buffer memory 55 is coupled to the memory management circuit 51 and is used to temporarily store data. The power management circuit 56 is coupled to the memory management circuit 51 and is used to control the power of the memory storage device 10.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

Figure 6:
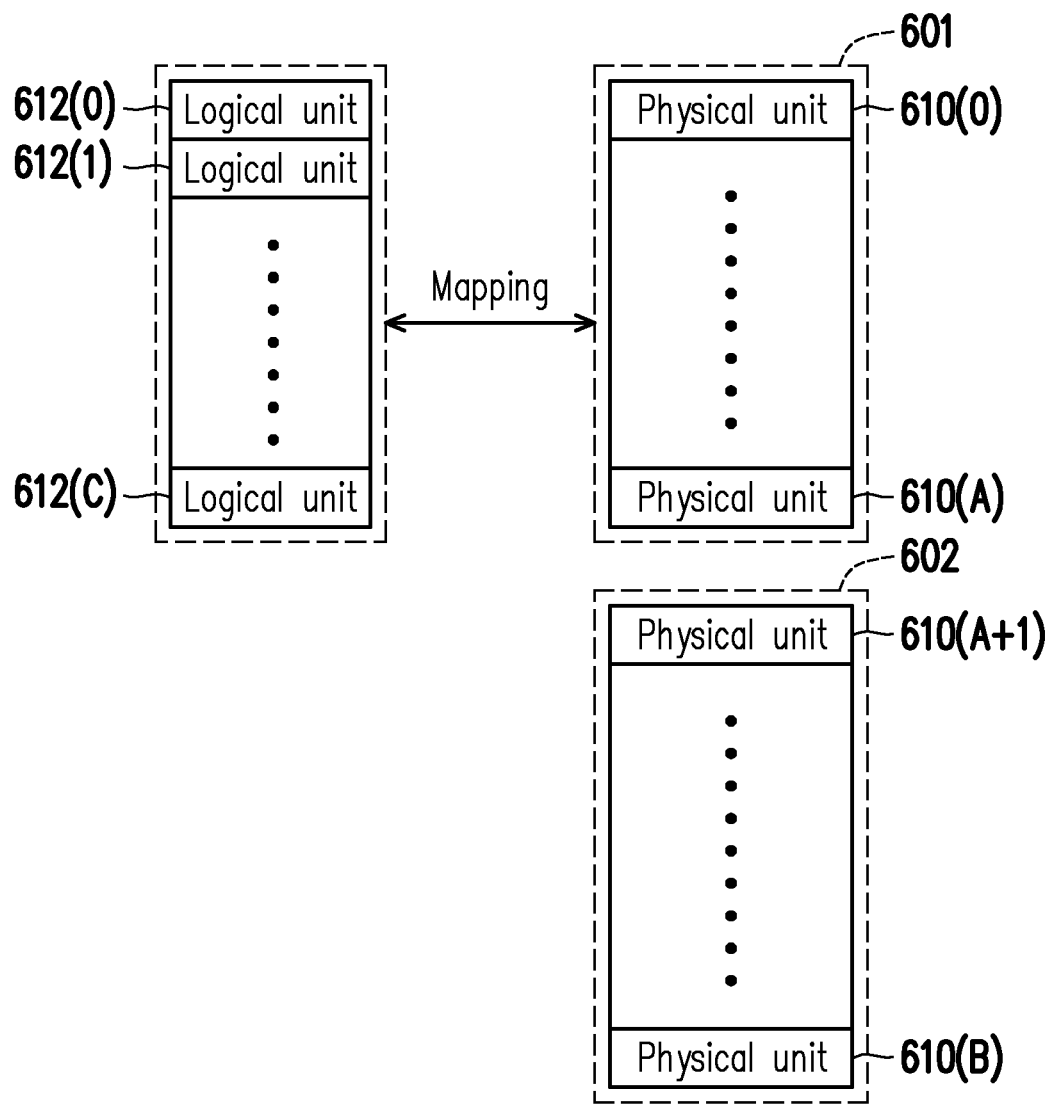
FIG. 6 is a schematic diagram of managing a rewritable non-volatile memory module according to an exemplary embodiment of the disclosure.

FIG. 6 is a schematic diagram of managing a rewritable non-volatile memory module according to an exemplary embodiment of the disclosure. Please refer to FIG. 6. The memory management circuit 51 may logically group physical units 610(0) to 610(B) in the rewritable non-volatile memory module 43 into a storage area 601 and a spare area 602.

In an exemplary embodiment, a physical unit refers to a physical address or a physical programming unit. In an exemplary embodiment, a physical unit may also be composed of multiple continuous or discontinuous physical addresses. In an exemplary embodiment, a physical unit may also refer to a virtual block (VB). One virtual block may include multiple physical addresses or multiple physical programming units.

The physical units 610(0) to 610(A) in the storage area 601 are used to store user data (for example, the user data from the host system 11 of FIG. 1). For example, the physical units 610(0) to 610(A) in the storage area 601 may store valid data and invalid data. The physical units 610(A+1) to 610(B) in the spare area 602 do not store data (for example, valid data). For example, if a certain physical unit does not store valid data, the physical unit may be associated (or added) to the spare area 602. In addition, the physical units (or the physical units that do not store valid data) in the spare area 602 may be erased. When writing new data, one or more physical units may be extracted from the spare area 602 to store the new data. In an exemplary embodiment, the spare area 602 is also referred to as a free pool.

The memory management circuit 51 may be configured with logical units 612(0) to 612(C) to map the physical units 610(0) to 610(A) in the storage area 601. In an exemplary embodiment, each logical unit corresponds to one logical address. For example, one logical address may include one or more logical block addresses (LBA) or other logical management units. In an exemplary embodiment, one logical unit may also correspond to one logical programming unit or consist of multiple continuous or discontinuous logical addresses.

It should be noted that one logical unit may be mapped to one or more physical units. If a certain physical unit is currently mapped by a certain logical unit, it means that data currently stored to the physical unit includes valid data. Conversely, if a certain physical unit is not currently mapped by any logical unit, it means that data currently stored to the physical unit is invalid data.

The memory management circuit 51 may record management data (also referred to as logical-to-physical mapping information) describing a mapping relationship between the logical unit and the physical unit in at least one logical-to-physical mapping table. When the host system 11 intends to read data from the memory storage device 10 or write data to the memory storage device 10, the memory management circuit 51 may access the rewritable non-volatile memory module 43 according to information in the logical-to-physical mapping table.

In an exemplary embodiment, the memory management circuit 51 may use a physical unit set to manage the physical units 610(0) to 610(A). One physical unit set may contain multiple physical units. One physical unit set may be used to store multiple frames. One physical unit may be used to store one or more frames. A single physical unit set may contain physical units in the same (or different) memory plane, the same (or different) memory die, and/or the same (or different) chip enable (CE) area.

In an exemplary embodiment, the error detecting and correcting circuit 54 may perform a multi-frame encoding on multiple frames stored to a certain physical unit set, so as to protect data in the frames using parity data generated by the multi-frame encoding. In an exemplary embodiment, the error detecting and correcting circuit 54 may perform a multi-frame decoding on multiple frames read from a certain physical unit set, so as to correct errors in the frames using the parity data generated by the multi-frame encoding. In an exemplary embodiment, the error detecting and correcting circuit 54 may perform a single-frame encoding on a single frame stored to a certain physical unit, so as to protect data in the single frame using parity data generated by the single-frame encoding. In an exemplary embodiment, the error detecting and correcting circuit 54 may perform a single-frame decoding on a single frame read from a certain physical unit, so as to correct errors in the single frame using the parity data generated by the single-frame encoding.

Figure 7:
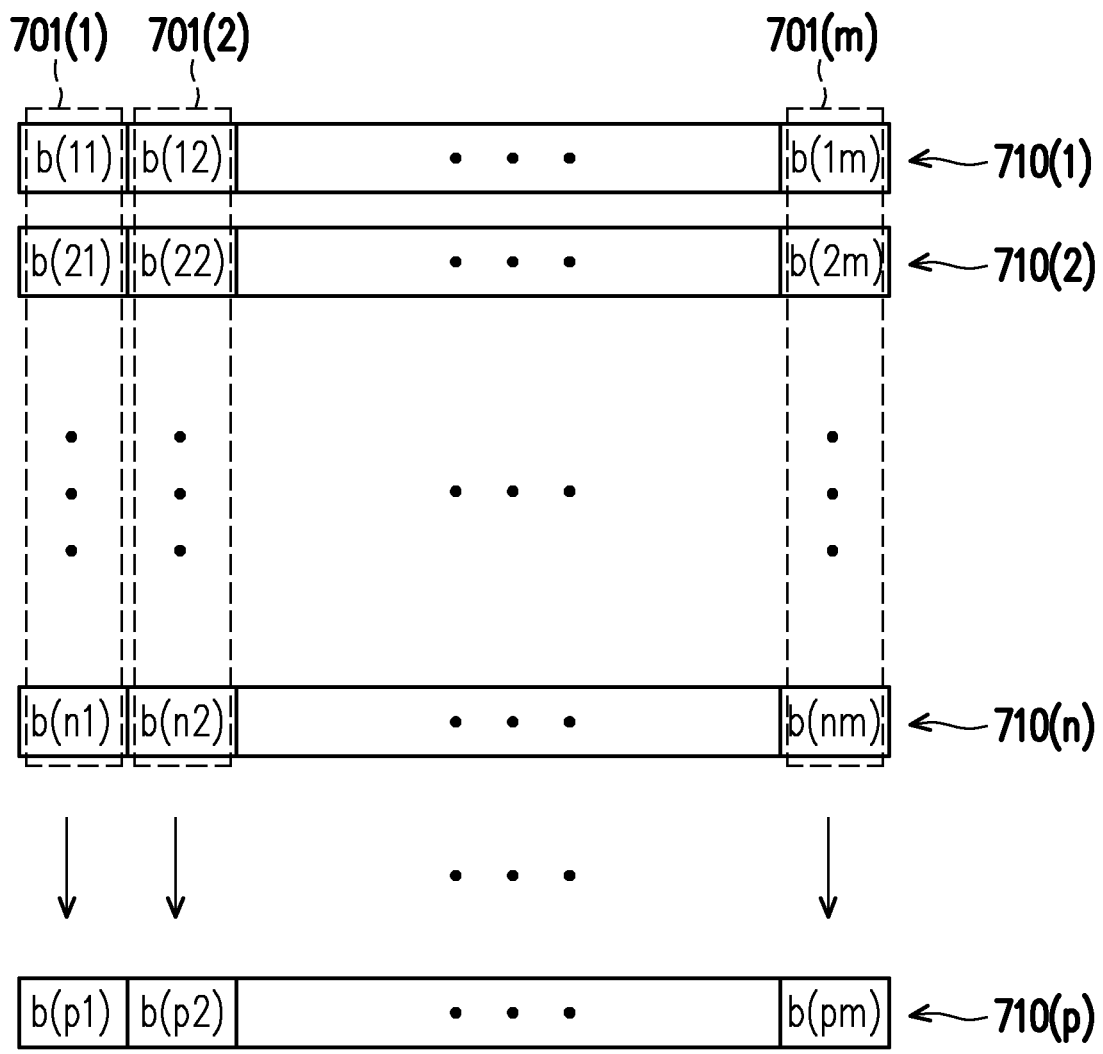
FIG. 7 is a schematic diagram of a multi-frame encoding according to an exemplary embodiment of the disclosure.

FIG. 7 is a schematic diagram of a multi-frame encoding according to an exemplary embodiment of the disclosure. Please refer to FIG. 7. Frames 710(1) to 710(*n*) contain data stored to a certain physical unit set (also referred to as a first physical unit set). For example, the first physical unit set may contain the physical units (also referred to as the first physical units) 610(1) to 610(*n*) in FIG. 6. The frame 710(*k*) contains data to be stored to the physical unit 610(*k*), where k is between 1 and n. The data in the frames 710(1) to 710(*n*) may contain data instructed to be stored by a write command sent by the host system 10. Alternatively, the data in the frames 710(1) to 710(*n*) may also contain data read from the rewritable non-volatile memory module 43 and waiting to be restored to the rewritable non-volatile memory module 43.

In an exemplary embodiment, the error detecting and correcting circuit 54 may perform the multi-frame encoding on the frames 710(1) to 710(*n*) to generate the frame 710(*p*). The data in the frame 710(*p*) contains parity data for protecting the frames 710(1) to 710(*n*). For example, when performing the multi-frame decoding on the frames 710(1) to 710(*n*), the parity data in the frame 710(*p*) may be used to detect and/or correct errors in the frames 710(1) to 710(*n*).

In an exemplary embodiment, during the multi-frame encoding, the data in the frames 710(1) to 710(*n*) is encoded based on a position of each bit (or byte). For example, bits b(11), b(21), . . . , b(n1) located in a position 701(1) may be encoded to obtain a bit b(p1) in the frame 710(*p*). Bits b(12), b(22), . . . , b(n2) located in a position 701(2) may be encoded to obtain a bit b(p2) in the frame 710(*p*). By analogy, bits b(1*m*), b(2*m*), . . . , b(nm) located in a position 701(*m*) may be encoded to obtain a bit b(pm) in the frame 710(*p*). Later, during the multi-frame decoding, the bits (also referred to as parity bits) in the frame 710(*p*) may be used to detect and/or correct error bits in the frames 710(1) to 710(*n*). For example, the bit b(p2) in the frame 710(*p*) may be used to detect or correct one or more error bits in the position 701(2).

It should be noted that in an exemplary embodiment, the arrangement manner of multiple bits covered by any one of the positions 701(1) to 701(*m*) may be different from the arrangement manner shown in FIG. 7, which is not limited by the disclosure. In addition, in an exemplary embodiment, the number of the frame 710(*p*) containing the parity data may also be 2 or more to provide different or preferable multi-frame decoding capabilities, which is not limited by the disclosure.

In an exemplary embodiment, the error detecting and correcting circuit 54 may perform the single-frame encoding on the frame 710(*j*) among the frames 710(1) to 710(*n*) and 710(*p*) to generate the parity data for protecting the frame 710(*j*), where j is between 1 and n or j may be p. Thereafter, during the single-frame decoding, the parity data generated by performing the single-frame encoding on the frame 710(*j*) may be used to detect and/or correct the error bits in the frame 710(*j*).

In an exemplary embodiment, the parity data generated by performing the multi-frame encoding in the frame 710(*p*) is also referred to as a redundant array of independent disks (RAID) error correcting code. In an exemplary embodiment, the frames 710(1) to 710(*n*) and 710(*p*) may also be combined and regarded as one block code. The frames 710(1) to 710(*n*) and 710(*p*) may be stored to the first physical units.

In an exemplary embodiment, when data stored to a certain physical unit in the first physical unit set is to be read, the memory management circuit 51 may send a read command sequence to the rewritable non-volatile memory module 43. The read command sequence may instruct the rewritable non-volatile memory module 43 to read the data from a specific physical unit. The rewritable non-volatile memory module 43 may return the data read from the specific physical unit to the memory management circuit 51 according to the read command sequence. The error detecting and correcting circuit 54 may perform the single-frame decoding on the frame containing the data. For example, if the single-frame encoding is performed on the data in the frame based on the LDPC codes, the error detecting and correcting circuit 54 may perform the single-frame decoding on the frame based on the LDPC codes. If the decoding is successful (indicating that the data in the frame is correct and/or the errors have been corrected), the error detecting and correcting circuit 54 may output the successfully decoded data. However, if the decoding fails (indicating that the frame is a frame that cannot be corrected by the single-frame decoding), the error detecting and correcting circuit 54 may start a multi-frame decoding process to perform the multi-frame decoding on multiple frames containing the frame. For example, if the multi-frame encoding is originally performed on the frame based on the RS (or XOR) codes, the error detecting and correcting circuit 54 may also perform the multi-frame decoding on the frame based on the RS (or XOR) codes. In an exemplary embodiment, a frame that cannot be corrected by the single-frame decoding is also referred to as a UECC frame.

It should be noted that during the multi-frame decoding based on the RS codes, there can only be at most two UECC frames among the frames to be decoded at the same time. If the frames to be decoded contain three or more UECC frames at the same time, the multi-frame decoding based on the RS codes will not be able to correct the errors in the frames. Similarly, during the multi-frame decoding based on the XOR codes, there can only be at most one UECC frame among the frames to be decoded at the same time. If the frames to be decoded contain two or more UECC frames at the same time, the multi-frame decoding based on the XOR codes will not be able to correct the errors in the frames. Therefore, after entering the multi-frame decoding process, by reducing the total number of UECC frames among the frames to be decoded, the decoding success rate of the multi-frame decoding can be effectively improved.

In an exemplary embodiment, after entering the multi-frame decoding process (for example, the single-frame decoding of a certain frame fails), the memory management circuit 51 may instruct the error detecting and correcting circuit 54 to respectively perform the single-frame decoding on multiple frames (also referred to as first data frames) read from the first physical unit set. For example, each first data frame is read from a certain physical unit (that is, the first physical unit) in the first physical unit set. Then, the memory management circuit 51 may judge whether an entire decoding result of the first data frames meets a specific condition (also referred to as a first condition).

In an exemplary embodiment, the first condition includes that the total number of frames that failed to be decoded (that is, UECC frames) among the first data frames during the single-frame decoding is greater than a threshold. For example, the threshold may be 1 or 2. For example, in an exemplary embodiment, if the multi-frame encoding/decoding is performed based on the XOR codes, the threshold may be 1. Alternatively, in an exemplary embodiment, if the multi-frame encoding/decoding is performed based on the RS codes, the threshold may be 2. In an exemplary embodiment, in response to the total number of UECC frames among the first data frames being greater than the threshold, the memory management circuit 51 may judge that the entire decoding result of the first data frames meets the first condition. Conversely, in response to the total number of UECC frames among the first data frames being not greater than the threshold, the memory management circuit 51 may judge that the entire decoding result of the first data frames does not meet the first condition.

In an exemplary embodiment, in response to the entire decoding result of the first data frames meeting the first condition, the memory management circuit 51 may try to update reliability information used during the single-frame decoding. Then, the error detecting and correcting circuit 54 may perform the single-frame decoding on a frame (also referred to as a second data frame) read from one of the first physical units according to the updated reliability information. By updating the reliability information, it is possible to try to improve the decoding success rate of performing the single-frame decoding on the second data frame. If the second data frame is successfully decoded, the total number of UECC frames among the first data frames may be correspondingly reduced (for example, reduced by 1). If the total number of UECC frames among the first data frames is reduced to not greater than the threshold, the memory management circuit 51 may judge that the entire decoding result of the first data frames does not meet the first condition.

In an exemplary embodiment, in response to the entire decoding result of the first data frames not meeting the first condition, the memory management circuit 51 may instruct the error detecting and correcting circuit 54 to perform the multi-frame decoding on the first data frames. During the multi-frame decoding, an interframe logical operation may be performed on the data in the first data frames to try to correct the errors in the data. In particular, in the case where the entire decoding result of the first data frames does not meet the first condition (that is, the total number of UECC frames among the first data frames is not greater than the threshold), there is a high probability (and may even be guaranteed) that the multi-frame decoding may completely correct all errors in the first data frames. Therefore, after entering the multi-frame decoding process, by gradually reducing or converging the total number of UECC frames among the frames to be decoded, the decoding success rate of the multi-frame decoding can be effectively improved.

In an exemplary embodiment, in response to the entire decoding result of the first data frames meeting the first condition, the memory management circuit 51 may obtain error evaluation information related to the first physical unit set. The error evaluation information may reflect a bit error status of the first physical unit set. For example, the error evaluation information may roughly reflect whether the total number of error bits contained in the data (that is, the first data frames) read from the first physical unit set is more or less. The memory management circuit 51 may obtain the reliability information according to the error evaluation information. For example, the reliability information may include a log likelihood ratio (LLR) that may be used during the single-frame decoding. The error detecting and correcting circuit 54 may perform the single-frame decoding on the second data frame according to the reliability information.

In an exemplary embodiment, the memory management circuit 51 may adjust at least part of the reliability information (for example, the LLR) from certain information (also referred to as first information) to another information (also referred to as second information) according to the error evaluation information. The first information may be different from the second information. According to different error evaluation information, the memory management circuit 51 may adjust the reliability information (for example, the LLR) to different degrees. Thereafter, the error detecting and correcting circuit 54 may perform the single-frame decoding on the second data frame based on the adjusted reliability information, thereby improving the decoding success rate of the second data frame. Under the premise that the decoding success rate of the single-frame decoding on the second data frame is improved, the total number of frames that cannot be corrected by the single-frame decoding among the frames to be decoded may be reduced, thereby improving the decoding success rate of the multi-frame decoding.

In an exemplary embodiment, the error evaluation information includes a count value. The count value may be positively correlated with an entire bit error rate of the first physical unit set. For example, the higher the entire bit error rate of the first physical unit set, the more the total number of UECC frames and/or the total number of error bits in the data read from the first physical unit set, and the greater the count value. Alternatively, from another perspective, the count value may also be positively correlated with the total number of UECC frames and/or the total number of error bits in the data read from the first physical unit set.

In an exemplary embodiment, the memory management circuit 51 may obtain the error evaluation information according to the entire decoding result of the first data frames. For example, the memory management circuit 51 may count the total number of frames that failed to be decoded (that is, the total number of UECC frames) among the first data frames according to the entire decoding result of the first data frames. The memory management circuit 51 may obtain the error evaluation information according to the total number.

Figure 8:
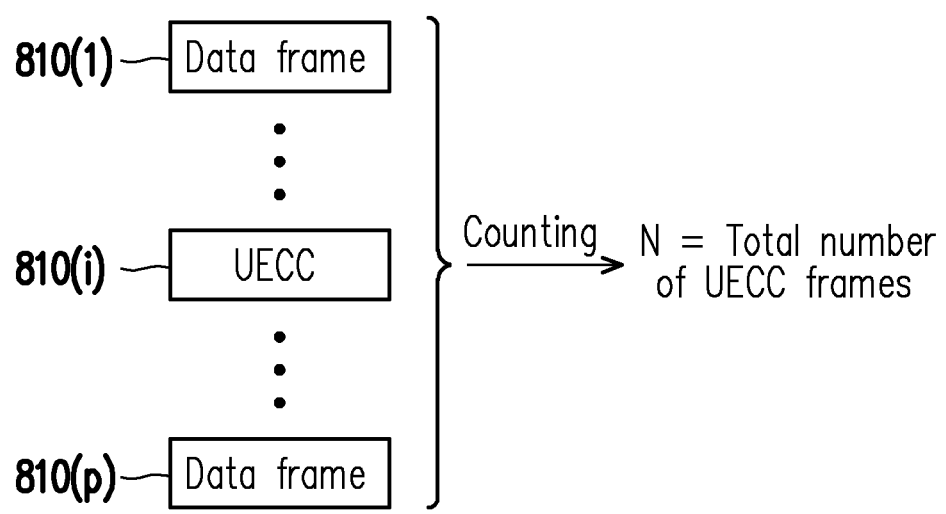
FIG. 8 is a schematic diagram of obtaining error evaluation information according to an exemplary embodiment of the disclosure.

FIG. 8 is a schematic diagram of obtaining error evaluation information according to an exemplary embodiment of the disclosure. Please refer to FIG. 8. Frames 810(1) to 810(p) are used to represent the first data frames. After respectively performing the single-frame decoding on the frames 810(1) to 810(p), the UECC frames (for example, the frame 810(i)) among the frames 810(1) to 810(p) may be recorded, as shown in FIG. 8. The memory management circuit 51 may count the total number of UECC frames among the frames 810(1) to 810(p) and obtain a count value N according to the total number. For example, the count value N may be equal to or reflect the total number of frames marked as UECC among the frames 810(1) to 810(p). Thereafter, the count value N may be contained in the error evaluation information and is used to adjust the reliability information.

In an exemplary embodiment, the error detecting and correcting circuit 54 may perform an integrated logical operation on the first data frames. The memory management circuit 51 may obtain the error evaluation information according to a performance result of the integrated logical operation. In an exemplary embodiment, the integrated logical operation may include performing a logical operation containing an XOR operation on the first data frames. Therefore, the performance result of the integrated logical operation may roughly reflect the total number of error bits in the first data frames. For example, after performing the integrated logical operation, the memory management circuit 51 may obtain a data sequence, which reflects the performance result of the integrated logical operation. The memory management circuit 51 may count the total number of specific bits (for example, bit "1" or "0") in the data sequence. The memory management circuit 51 may obtain the error evaluation information according to the total number.

Figure 9:
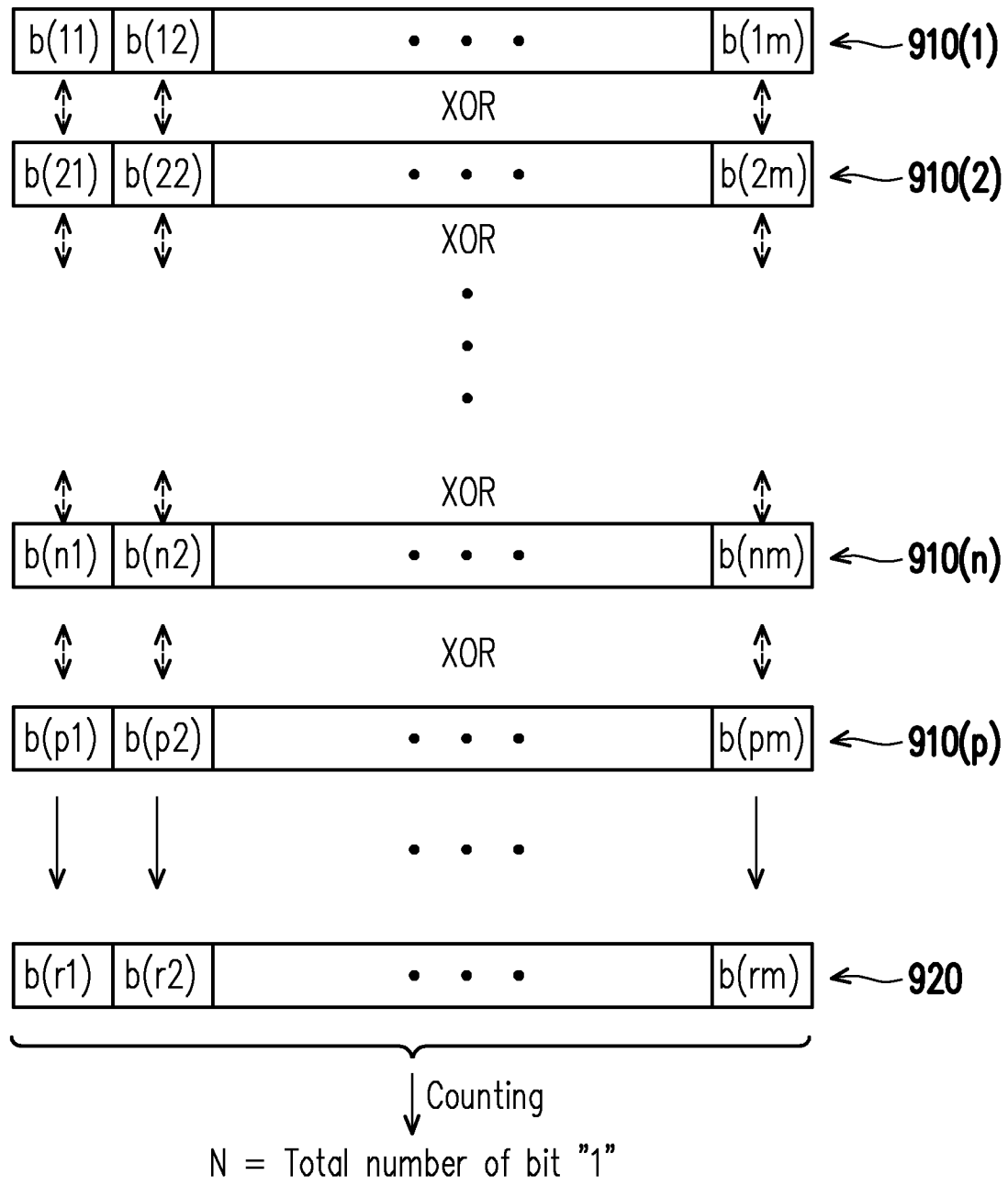
FIG. 9 is a schematic diagram of obtaining error evaluation information according to an exemplary embodiment of the disclosure.

FIG. 9 is a schematic diagram of obtaining error evaluation information according to an exemplary embodiment of the disclosure. Please refer to FIG. 9. Frames 910(1) to 910(p) are used to represent the first data frames. After performing a logical operation containing the XOR operation on the frames 910(1) to 910(p), a data sequence 920 may be obtained. For example, the data sequence 920 may include bits b(r1) to b(rm). For example, the bit b(r1) reflects an XOR performance result of the bits b(11), b(21), ... to b(p1), as shown in FIG. 9. The memory management circuit 51 may count the total number of bits "1" in the data sequence 920 and obtain the count value N according to the total number. For example, the count value N may be equal to or reflect the total number of bits "1" in the data sequence 920. In addition, the count value N may roughly reflect the total number of error bits in the frames 910(1) to 910(p). For example, the more the total number of error bits in the frames 910(1) to 910(p), there is a high probability that the total number of bits "1" in the data sequence 920 is more.

Thereafter, the count value N may be contained in the error evaluation information and is used to adjust the reliability information.

Figure 10:
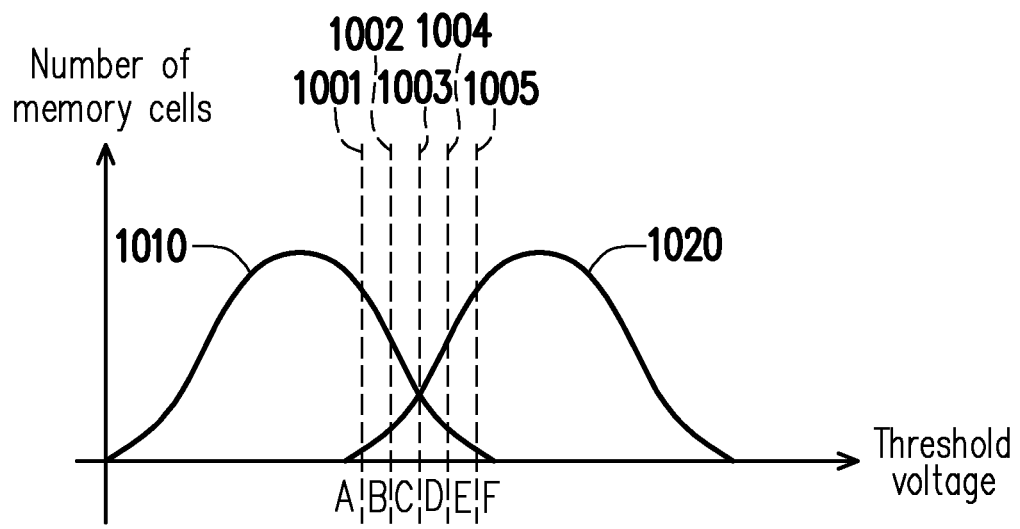
FIG. 10 is a schematic diagram of a threshold voltage distribution of memory cells according to an exemplary embodiment of the disclosure.

FIG. 10 is a schematic diagram of a threshold voltage distribution of memory cells according to an exemplary embodiment of the disclosure. Please refer to FIG. 10. It is assumed that threshold voltage distributions of the memory cells in the first physical units include statuses 1010 and 1020. The status 1010 may be used to represent a distribution status of the threshold voltage of the memory cells used to store a first bit (or a first bit combination) among the memory cells. The status 1020 may be used to represent a distribution status of the threshold voltage of the memory cells used to store a second bit (or a second bit combination) among the memory cells. For example, the first bit may be bit "0" (or the first bit combination may be bit "000", etc.), and the second bit may be bit "1" (or the second bit combination may be bit "101", etc.). In addition, the disclosure does not limit the bits or the bit combinations respectively corresponding to the statuses 1010 and 1020.

In an exemplary embodiment, the memory management circuit 51 may send a read command sequence to the rewritable non-volatile memory module 43 to instruct to use read voltage levels 1001 to 1005 to read the memory cells. The total number of read voltage levels 1001 to 1005 may be more or less. According to a read result of the read voltage levels 1001 to 1005 on the memory cells, the memory management circuit 51 may recognize a threshold voltage of each of the memory cells as one of voltage ranges A to F. Thereafter, assuming that the threshold voltage of a certain memory cell belongs to the voltage range A, the reliability information (for example, the LLR) corresponding to the voltage range A may be used during the single-frame decoding to decode the data bits read from the memory cell. Alternatively, assuming that the threshold voltage of a certain memory unit belongs to the voltage range C, the reliability information (for example, the LLR) corresponding to the voltage range C may be used during the single-frame decoding to decode the data bits read from the memory cell, and so on and so forth.

Figure 11:
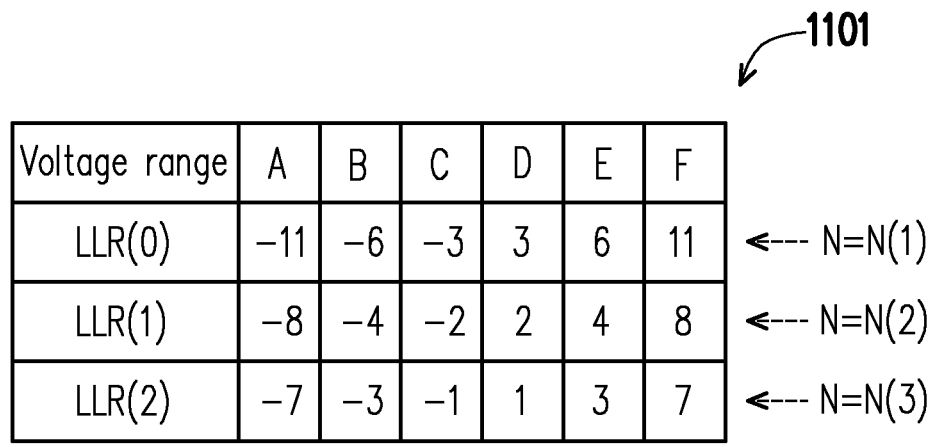
FIG. 11 is a schematic diagram of a reliability information table according to an exemplary embodiment of the disclosure.

FIG. 11 is a schematic diagram of a reliability information table according to an exemplary embodiment of the disclosure. Please refer to FIG. 11. It is assumed that the reliability information that may be adopted for different error evaluation information is recorded in table data 1101. In an exemplary embodiment, if the count value N=N(1) in the obtained error evaluation information, according to the table data 1101, a parameter value (for example, a LLR value) corresponding to the voltage ranges A to F in reliability information LLR(0) may be used during the single-frame decoding after starting the multi-frame decoding process to decode (that is, the single-frame decoding) data read from a certain physical unit. By analogy, if the count value N=N(2) or N(3) in the obtained error evaluation information, according to the table data 1101, the parameter value (for example, the LLR value) corresponding to the voltage ranges A to F in reliability information LLR(1) or LLR(2) may be used during the single-frame decoding after starting the multi-frame decoding process.

In an exemplary embodiment, it is assumed that the reliability information used during the previous single-frame decoding is LLR(0). After obtaining the latest count value N=N(2), the reliability information used during the single-frame decoding may be adjusted from LLR(0) to LLR(1). Thereafter, the single-frame decoding may be performed on at least one frame (that is, the second data frame) read from the first physical unit based on the reliability information LLR(1). Under a bit error status corresponding to the count value N=N(2), compared to the reliability information LLR(0), performing the single-frame decoding based on the reliability information LLR(1) can improve the decoding success rate of the single-frame decoding. Therefore, after starting the multi-frame decoding process, by adopting the reliability information more suitable for the bit error status of the current first physical unit set to perform the single-frame decoding, the total number of frames originally judged as uncorrectable (that is, UECC) may be reduced, thereby improving the decoding success rate of the multi-frame decoding.

Figure 12:
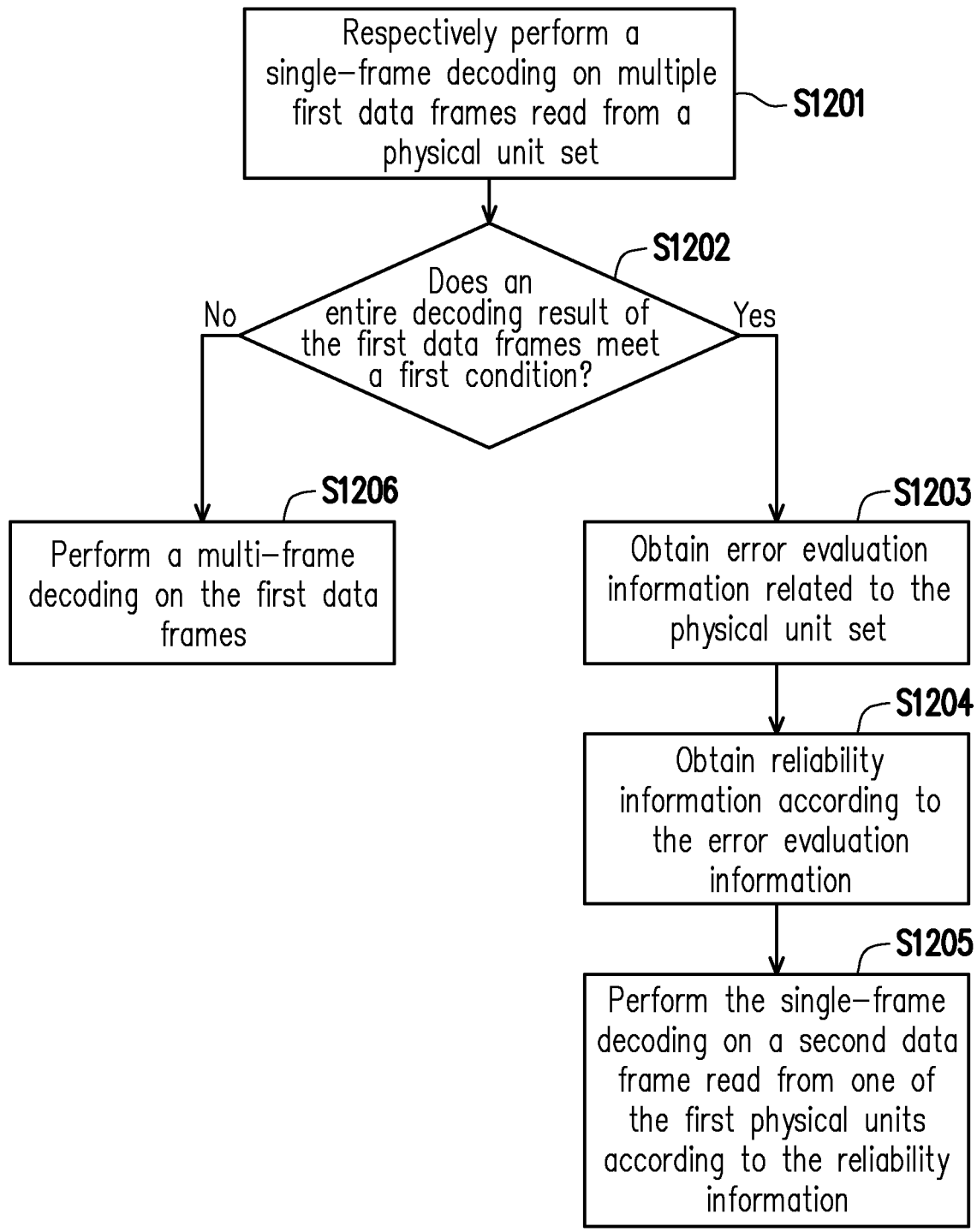
FIG. 12 is a flowchart of a decoding method according to an exemplary embodiment of the disclosure.

FIG. 12 is a flowchart of a decoding method according to an exemplary embodiment of the disclosure. Please refer to FIG. 12. In Step S1201, a single-frame decoding is respectively performed on multiple first data frames read from a physical unit set. The physical unit set includes multiple first physical units. In Step S1202, whether an entire decoding result of the first data frames meets a first condition is judged. If yes, in response to the entire decoding result of the first data frames meeting the first condition, in Step S1203, error evaluation information related to the physical unit set is obtained. The error evaluation information reflects a bit error status of the physical unit set. In Step S1204, reliability information is obtained according to the error evaluation information. In Step S1205, the single-frame decoding is performed on a second data frame read from one of the first physical units according to the reliability information. On the other hand, if the judgement in Step S1202 is no, in response to the entire decoding result of the first data frames not meeting the first condition, in Step S1206, a multi-frame decoding is performed on the first data frames.

Figure 13:
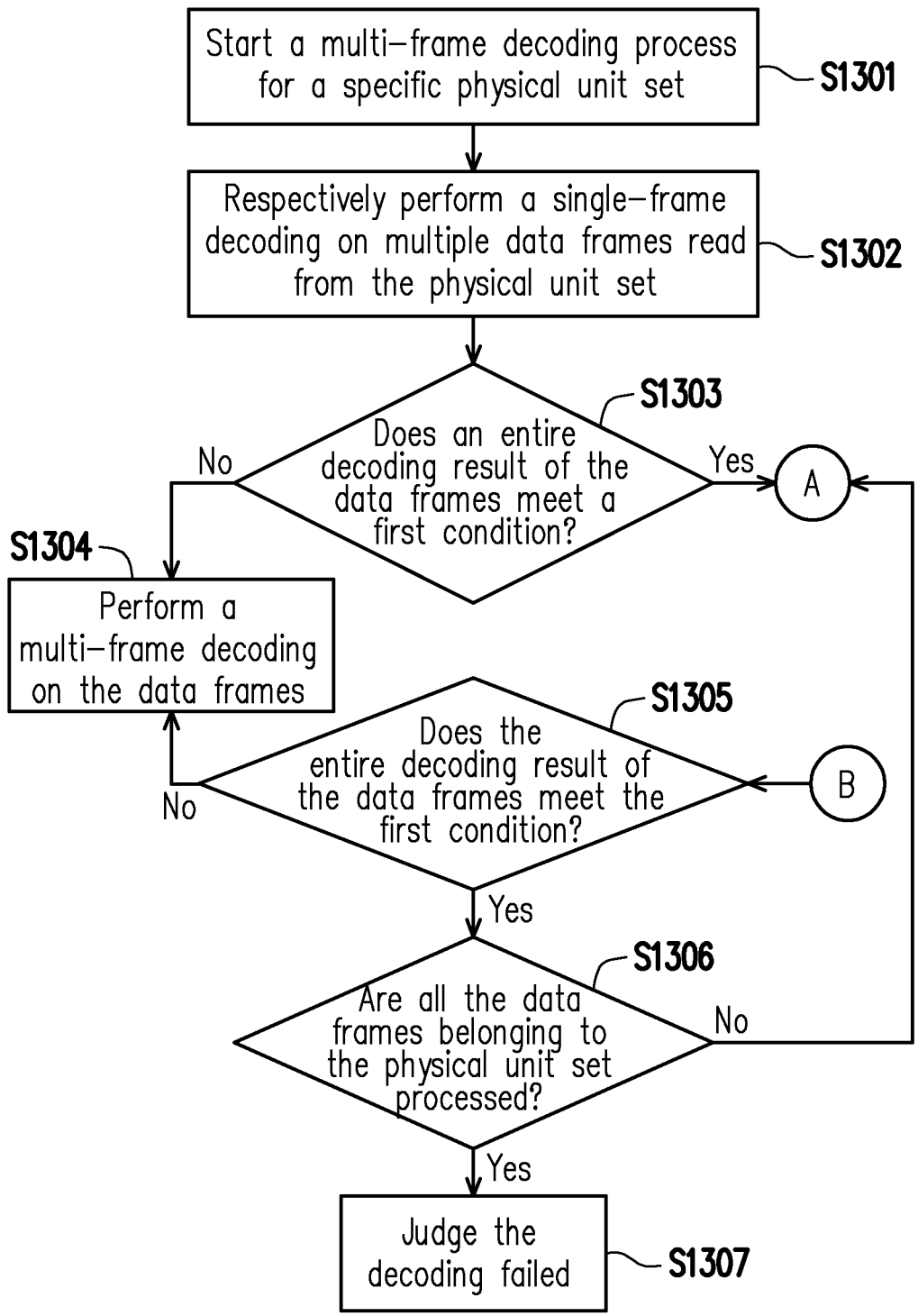
FIG. 13 and FIG. 14 are flowcharts of a decoding method according to an exemplary embodiment of the disclosure.
Figure 14:
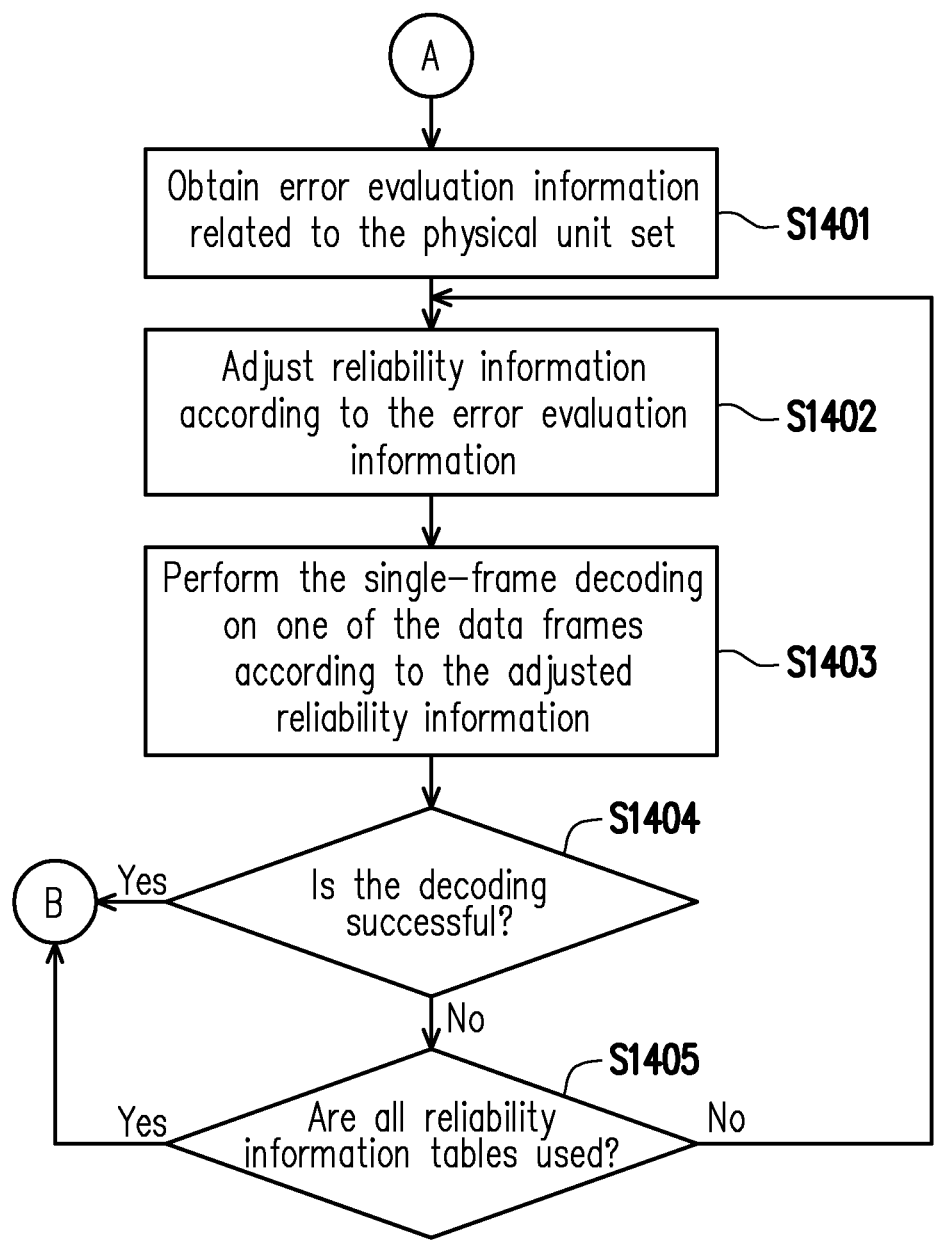

FIG. 13 and FIG. 14 are flowcharts of a decoding method according to an exemplary embodiment of the disclosure. Please refer to FIG. 13. In Step S1301, a multi-frame decoding process is started for a specific physical unit set. In Step S1302, a single-frame decoding is respectively performed on multiple data frames read from multiple first physical units in the physical unit set. In Step S1303, whether an entire decoding result of the data frames meets a first condition is judged (for example, whether the total number of UECC frames is greater than a threshold is judged). If the entire decoding result of the data frames does not meet the first condition (for example, the total number of UECC frames is not greater than the threshold), in Step S1304, a multi-frame decoding is performed on the data frames. On the other hand, if the entire decoding result of the data frames meets the first condition (for example, the total number of UECC frames is greater than the threshold), proceed to Step S1401 of FIG. 14.

Please refer to FIG. 14. In Step S1401, error evaluation information related to the physical unit set is obtained. In Step S1402, reliability information is adjusted according to the error evaluation information. In Step S1403, the single-frame decoding is performed on one of the data frames according to the adjusted reliability information. In Step S1404, whether the single-frame decoding is successful is judged. If the decoding is not successful (that is, the decoding fails), in Step S1405, whether all reliability information tables are used is judged. For example, the reliability information tables are pre-stored to a rewritable non-volatile memory module. During the single-frame decoding, the reliability information tables may be sequentially used to provide usable reliability information.

Taking FIG. 11 as an example, different reliability information tables may record different table data 1101. After starting the multi-frame decoding process, the count value N (or the error evaluation information) may be used to query one of the reliability information tables to obtain the corresponding reliability information. If not all the reliability information tables are used, it is possible to return to Step S1402, the count value N (or the error evaluation information) is used to query another reliability information table to adjust the reliability information and continue performing Step S1403. On the other hand, if the decoding is judged as successful (indicating that the number of UECC frames is reduced by one) in Step S1404 or all the reliability information tables are judged as being used in Step S1405, proceed to Step S1305 of FIG. 13.

Returning to FIG. 13, in Step S1305, whether the entire decoding result of the data frames meets the first condition is judged again. If the entire decoding result of the data frames does not meet the first condition (for example, the total number of UECC frames is not greater than the threshold), in Step S1304, the multi-frame decoding is performed on the data frames. However, if the entire decoding result of the data frames meets the first condition (for example, the total number of UECC frames is greater than the threshold), in Step S1306, whether the processing flow of FIG. 14 is performed on all the data frames belonging to the physical unit set is judged. If there is still a data frame that is not processed by the processing flow of FIG. 14, return to Step S1401 of FIG. 14 to process the data frame. However, if all the data frames are judged as being processed in Step S1306, the decoding fails is judged in Step S1307 and an error processing process is performed (for example, an access error of the host system is reported).

However, each step in FIG. 12 to FIG. 14 has been described in detail as above, and will not be repeated here. It should be noted that each step in FIG. 12 to FIG. 14 may be implemented as multiple program codes or circuits, which is not limited by the disclosure. In addition, the methods of FIG. 12 to FIG. 14 may be used in conjunction with the above exemplary embodiments or may be used alone, which is not limited by the disclosure.

In summary, in the exemplary embodiments of the disclosure, after starting the multi-frame decoding process, the appropriate reliability information may be obtained according to the error evaluation information of the specific physical unit set, and the single-frame decoding is performed on the data frame read from the specific physical unit set according to the reliability information. In particular, after starting the multi-frame decoding process, if the total number of UECC frames in the physical unit set is still higher than the threshold, the reliability information used for the single-frame decoding may be updated or adjusted, and the single-frame decoding may be performed again based on the new reliability information. In this way, the total number of UECC frames in the physical unit set may be effectively reduced, and the decoding capability of the data frames in the physical unit set can be synchronously improved.

Although the disclosure has been disclosed in the above embodiments, the embodiments are not intended to limit the disclosure. Persons skilled in the art may make some changes and modifications without departing from the spirit and scope of the disclosure. The protection scope of the disclosure shall be defined by the appended claims.

What is claimed is:

1. A decoding method, used in a memory storage device, wherein the memory storage device comprises a rewritable non-volatile memory module, the rewritable non-volatile memory module comprises a plurality of physical units, and the decoding method comprises:

respectively performing a single-frame decoding on a plurality of first data frames read from a physical unit set, wherein the physical unit set contains a plurality of first physical units among the plurality of physical units;

in response to an entire decoding result of the plurality of first data frames meeting a first condition, obtaining error evaluation information related to the physical unit set, wherein the error evaluation information reflects a bit error status of the physical unit set;

obtaining reliability information according to the error evaluation information; and performing the single-frame decoding on a second data frame read from one of the plurality of first physical units according to the reliability information.

2. The decoding method according to claim 1, wherein the error evaluation information comprises a count value, and the count value is positively correlated with a bit error rate of the physical unit set.

3. The decoding method according to claim 1, wherein the step of obtaining the error evaluation information related to the physical unit set comprises:

counting a total number of frames that failed to be decoded among the plurality of first data frames according to the entire decoding result of the plurality of first data frames; and obtaining the error evaluation information according to the total number.

4. The decoding method according to claim 1, wherein the step of obtaining the error evaluation information related to the physical unit set comprises:

performing an integrated logical operation on the plurality of first data frames; and obtaining the error evaluation information according to a performance result of the integrated logical operation.

5. The decoding method according to claim 4, wherein the step of obtaining the error evaluation information according to the performance result of the integrated logical operation comprises:

obtaining a data sequence, reflecting the performance result of the integrated logical operation;

counting a total number of at least one specific bit in the data sequence; and obtaining the error evaluation information according to the total number.

6. The decoding method according to claim 1, wherein the step of obtaining the reliability information according to the error evaluation information comprises:

adjusting at least part of the reliability information from first information to second information according to the error evaluation information, wherein the first information is different from the second information.

7. The decoding method according to claim 1, further comprising:

in response to the entire decoding result of the plurality of first data frames not meeting the first condition, performing a multi-frame decoding on the plurality of first data frames.

8. The decoding method according to claim 1, wherein the first condition comprises that a total number of frames that failed to be decoded among the plurality of first data frames is greater than a threshold.

9. A memory storage device, comprising:

a connection interface unit, used to couple to a host system;

a rewritable non-volatile memory module, comprising a plurality of physical units; and a memory control circuit unit, coupled to the connection interface unit and the rewritable non-volatile memory module, wherein the memory control circuit unit is used to respectively perform a single-frame decoding on a plurality of first data frames read from a physical unit set, and the physical unit set contains a plurality of first physical units among the plurality of physical units, in response to an entire decoding result of the plurality of first data frames meeting a first condition, the memory control circuit unit is further used to obtain error evaluation information related to the physical unit set, wherein the error evaluation information reflects a bit error status of the physical unit set, the memory control circuit unit is further used to obtain reliability information according to the error evaluation information, and the memory control circuit unit is further used to perform the single-frame decoding on a second data frame read from one of the plurality of first physical units according to the reliability information.

10. The memory storage device according to claim 9, wherein the error evaluation information comprises a count value, and the count value is positively correlated with a bit error rate of the physical unit set.

11. The memory storage device according to claim 9, wherein the operation of obtaining the error evaluation information related to the physical unit set comprises:
counting a total number of frames that failed to be decoded among the plurality of first data frames according to the entire decoding result of the plurality of first data frames; and
obtaining the error evaluation information according to the total number.

12. The memory storage device according to claim 9, wherein the operation of obtaining the error evaluation information related to the physical unit set comprises:
performing an integrated logical operation on the plurality of first data frames; and
obtaining the error evaluation information according to a performance result of the integrated logical operation.

13. The memory storage device according to claim 12, wherein the operation of obtaining the error evaluation information according to the performance result of the integrated logical operation comprises:
obtaining a data sequence, reflecting the performance result of the integrated logical operation;
counting a total number of at least one specific bit in the data sequence; and
obtaining the error evaluation information according to the total number.

14. The memory storage device according to claim 9, wherein the operation of obtaining the reliability information according to the error evaluation information comprises:
adjusting at least part of the reliability information from first information to second information according to the error evaluation information, wherein the first information is different from the second information.

15. The memory storage device according to claim 9, wherein the memory control circuit unit is further used to:
in response to the entire decoding result of the plurality of first data frames not meeting the first condition, perform a multi-frame decoding on the plurality of first data frames.

16. The memory storage device according to claim 9, wherein the first condition comprises that a total number of frames that failed to be decoded among the plurality of first data frames is greater than a threshold.

17. A memory control circuit unit, used to control a rewritable non-volatile memory module, wherein the rewritable non-volatile memory module comprises a plurality of physical units, and the memory control circuit unit comprises:
a host interface, used to couple to a host system;
a memory interface, used to couple to the rewritable non-volatile memory module;
an error detecting and correcting circuit, and
a memory management circuit, coupled to the host interface, the memory interface, and the error detecting and correcting circuit, wherein the error detecting and correcting circuit is used to respectively perform a single-frame decoding on a plurality of first data frames read from a physical unit set, and the physical unit set contains a plurality of first physical units among the plurality of physical units, in response to an entire decoding result of the plurality of first data frames meeting a first condition, the memory management circuit is further used to obtain error evaluation information related to the physical unit set, wherein the error evaluation information reflects a bit error status of the physical unit set, the memory management circuit is further used to obtain reliability information according to the error evaluation information, and the error detecting and correcting circuit is further used to perform the single-frame decoding on a second data frame read from one of the plurality of first physical units according to the reliability information.

18. The memory control circuit unit according to claim 17, wherein the error evaluation information comprises a count value, and the count value is positively correlated with a bit error rate of the physical unit set.

19. The memory control circuit unit according to claim 17, wherein the operation of obtaining the error evaluation information related to the physical unit set comprises:
counting a total number of frames that failed to be decoded among the plurality of first data frames according to the entire decoding result of the plurality of first data frames; and
obtaining the error evaluation information according to the total number.

20. The memory control circuit unit according to claim 17, wherein the operation of obtaining the error evaluation information related to the physical unit set comprises:
performing an integrated logical operation on the plurality of first data frames; and
obtaining the error evaluation information according to a performance result of the integrated logical operation.

21. The memory control circuit unit according to claim 20, wherein the operation of obtaining the error evaluation information according to the performance result of the integrated logical operation comprises:
obtaining a data sequence, reflecting the performance result of the integrated logical operation;
counting a total number of at least one specific bit in the data sequence; and
obtaining the error evaluation information according to the total number.

22. The memory control circuit unit according to claim 17, wherein the operation of obtaining the reliability information according to the error evaluation information comprises:

adjusting at least part of the reliability information from first information to second information according to the error evaluation information, wherein the first information is different from the second information.

23. The memory control circuit unit according to claim 17, wherein the error detecting and correcting circuit is further used to:
in response to the entire decoding result of the plurality of first data frames not meeting the first condition, perform a multi-frame decoding on the plurality of first data frames.

24. The memory control circuit unit according to claim 17, wherein the first condition comprises that a total number of frames that failed to be decoded among the plurality of first data frames is greater than a threshold.

25. A memory storage device, comprising:
a connection interface unit, used to couple to a host system;
a rewritable non-volatile memory module, comprising a plurality of physical units; and
a memory control circuit unit, coupled to the connection interface unit and the rewritable non-volatile memory module, wherein the memory control circuit unit is used to respectively perform a single-frame decoding on a plurality of first data frames read from a physical unit set, and the physical unit set contains a plurality of first physical units among the plurality of physical units,
in response to an entire decoding result of the plurality of first data frames meeting a first condition, the memory control circuit unit updates reliability information and performs the single-frame decoding on a second data frame read from one of the plurality of first physical units according to the updated reliability information, and
in response to the entire decoding result of the plurality of first data frames not meeting the first condition, the memory control circuit unit is further used to perform a multi-frame decoding on the plurality of first data frames.

26. The memory storage device according to claim 25, wherein the first condition comprises that a total number of frames that failed to be decoded among the plurality of first data frames is greater than a threshold.

* * * * *